(12) United States Patent
Hagerman et al.

(10) Patent No.: US 8,965,292 B2
(45) Date of Patent: Feb. 24, 2015

(54) METHODS AND ARRANGEMENTS IN A MOBILE TELECOMMUNICATION NETWORK

(75) Inventors: Bo Hagerman, Tyresö (SE); Fredrik Gunnarsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1024 days.

(21) Appl. No.: 11/990,691

(22) PCT Filed: Oct. 26, 2005

(86) PCT No.: PCT/SE2005/001605
§ 371 (c)(1),
(2), (4) Date: Feb. 20, 2008

(87) PCT Pub. No.: WO2007/049998
PCT Pub. Date: May 3, 2007

(65) Prior Publication Data
US 2009/0168906 A1 Jul. 2, 2009

(51) Int. Cl.
*H04K 1/10* (2006.01)
*H04W 4/00* (2009.01)
*H04B 1/00* (2006.01)
*H04W 72/00* (2009.01)
(Continued)

(52) U.S. Cl.
CPC ........... *H04W 72/082* (2013.01); *H04B 1/7097* (2013.01); *H04B 2201/70702* (2013.01)
USPC .......... 455/63.1; 455/442; 455/434; 455/450; 375/260; 370/329; 370/341; 370/331

(58) Field of Classification Search
USPC ................. 375/260; 455/434, 63.1, 450, 442; 30/329, 341–348, 331
See application file for complete search history.

(56) References Cited

U.S. PATENT DOCUMENTS 5,894,500 A 4/1999 Bruckert et al.
6,519,240 B1 * 2/2003 Dillinger et al. ............. 370/337
(Continued)

FOREIGN PATENT DOCUMENTS

CN 1543239 11/2004
EP 1 298 953 A2 4/2003
(Continued)

OTHER PUBLICATIONS

PCT Demand dated Oct. 26, 2005.
(Continued)

*Primary Examiner* — Nay A Maung
*Assistant Examiner* — Erica Fleming-Hall

(57) ABSTRACT

A first unit for use in a base station in a mobile telecommunication network is adapted to use an identity for identifying a mobile terminal or for identifying a channel in the uplink. The first unit manages information of at least one additional identity of a mobile terminal or a channel belonging to at least a second base station for interference mitigation purposes. The first unit detects whether the mobile terminal or channel identified by the additional identity is active and mitigates cell-interference caused by an active mobile terminal or a channel identified by the additional identity. A second unit reserves at least one identity for identifying a mobile terminal or for identifying a channel in order to make the at least one identity identifiable to at least a second base station.

18 Claims, 2 Drawing Sheets

(51) Int. Cl.
*H04W 72/08* (2009.01)
*H04B 1/7097* (2011.01)

(56) References Cited

U.S. PATENT DOCUMENTS

| | | | |
|---|---|---|---|
| 6,526,039 B1* | 2/2003 | Dahlman et al. | 370/350 |
| 6,577,671 B1 | 6/2003 | Vimpari | |
| 6,795,409 B1* | 9/2004 | Youssefmir et al. | 370/328 |
| 7,043,259 B1* | 5/2006 | Trott | 455/458 |
| 2002/0027957 A1* | 3/2002 | Paulraj et al. | 375/267 |
| 2002/0031105 A1* | 3/2002 | Zeira et al. | 370/337 |
| 2002/0051433 A1* | 5/2002 | Affes et al. | 370/335 |
| 2002/0071411 A1* | 6/2002 | Masui et al. | 370/335 |
| 2002/0147017 A1 | 10/2002 | Li et al. | |
| 2002/0164989 A1* | 11/2002 | Skillermark et al. | 455/446 |
| 2003/0003906 A1 | 1/2003 | Demers et al. | |
| 2003/0176169 A1* | 9/2003 | Pajukoski et al. | 455/77 |
| 2004/0229624 A1* | 11/2004 | Cai et al. | 455/449 |
| 2005/0090244 A1* | 4/2005 | Ammi et al. | 455/423 |
| 2005/0096062 A1 | 5/2005 | Ji et al. | |
| 2005/0111405 A1 | 5/2005 | Kanterakis | |
| 2005/0130662 A1* | 6/2005 | Murai | 455/444 |
| 2005/0190737 A1* | 9/2005 | Tanno et al. | 370/342 |
| 2005/0232195 A1* | 10/2005 | Jones | 370/329 |
| 2006/0073833 A1* | 4/2006 | Hamalainen et al. | 455/447 |
| 2006/0165032 A1* | 7/2006 | Hamalainen et al. | 370/328 |
| 2006/0172739 A1* | 8/2006 | Wigard et al. | 455/442 |
| 2006/0234702 A1* | 10/2006 | Wiberg et al. | 455/432.3 |
| 2007/0042784 A1* | 2/2007 | Anderson | 455/450 |
| 2007/0070926 A1* | 3/2007 | Bachl et al. | 370/310 |
| 2007/0167191 A1* | 7/2007 | Carlsson | 455/562.1 |
| 2007/0281695 A1* | 12/2007 | Lohr et al. | 455/436 |
| 2007/0291870 A1* | 12/2007 | Ponnekanti | 375/295 |
| 2008/0170638 A1* | 7/2008 | Schmidl et al. | 375/295 |
| 2008/0310329 A1* | 12/2008 | Sun et al. | 370/280 |
| 2009/0143070 A1* | 6/2009 | Shu et al. | 455/450 |
| 2009/0176516 A1* | 7/2009 | Trott | 455/458 |

FOREIGN PATENT DOCUMENTS

| | | |
|---|---|---|
| EP | 1 414 253 | 4/2004 |
| GB | 2 412 036 | 9/2005 |
| JP | 2002-506583 | 2/2002 |
| WO | WO 98/54853 | 12/1998 |
| WO | WO 98/57452 | 12/1998 |
| WO | WO 03/096560 | 11/2003 |
| WO | WO03096560 | 11/2003 |

OTHER PUBLICATIONS

International Search Report for PCT/SE2005/001605 dated Jun. 28, 2006.
Written Opinion of the International Searching Authority mailed Jun. 28, 2006.
Response to Written Opinion dated Aug. 16, 2007.
Written Opinion of the International Searching Authority mailed Oct. 29, 2007.
Written Opinion of the International Searching Authority mailed Nov. 16, 2007.
Response to Written Opinion dated Dec. 3, 2007.
International Preliminary Report on Patentability dated Jan. 29, 2008.
Translation of Chinese Official Action, Apr. 14, 2010 in corresponding Chinese Application No. 2005/80051906.
Translation of Chinese official action, Feb. 23, 2011, in corresponding Chinese Application No. 2005-80051906.5.
Japanese official action and English summary of official action, May 27, 2011, in corresponding Japanese Application No. JP 2008-537628.
Canadian Official Action, Sep. 21, 2011, in corresponding Canadian Application No. 2,622,449.
Summary of Japanese Official Action, Aug. 19, 2011, in corresponding Japanese Application No. 2008-537628.
Japanese Office Action dated May 18, 2012 in corresponding Japanese Application No. 2008-537628.
Examination Report in corresponding European Patent Application No. 057987585.1 dated Oct. 19, 2012.

* cited by examiner

METHODS AND ARRANGEMENTS IN A MOBILE TELECOMMUNICATION NETWORK

This application is the U.S. national phase of International Application No. PCT/SE2005/001605 filed 26 Oct. 2005, the entire content of which is hereby incorporated by reference.

TECHNICAL FIELD

The technical field relates to a mobile telecommunication network. The technology described in this application relates to mitigation of inter-cell interference in the uplink direction of the mobile telecommunication network.

BACKGROUND

Digital communication systems comprise time-division multiple access (TDMA) systems, such as cellular radio telephone systems that comply with the GSM telecommunication standard and its enhancements like GSM/EDGE, and code-division multiple access (CDMA) systems, such as cellular radio telephone systems that comply with the IS-95, cdma2000, and WCDMA telecommunication standards. Digital communication systems also include cellular radio telephone systems that comply with the universal mobile telecommunications system (UMTS) standard, which specifies a third generation (3G) mobile system. Another example of digital communication system is Orthogonal Frequency Division Multiplex (OFDM) based networks.

The technology described in this application will be described in the context of a WCDMA based UMTS network, but it should be noted that it is not limited to such a network. The radio access network of a UMTS network is referred to as UMTS terrestrial radio access network (UTRAN). The UTRAN is illustrated in FIG. 1 and comprises at least one Radio Network System (RNS) connected to the Core Network (CN). The CN is connectable to other networks such as the Internet, other mobile networks e.g. GSM systems and fixed telephony networks. The RNS comprises at least one Radio Network Controller (RNC). Furthermore, the respective RNC controls a plurality of Node Bs, also referred to as base stations, that are connected to the RNC. Each Node B covers one or more cells and is arranged to serve the User Equipment (UE) within said cell. Finally, the UE, also referred to as mobile terminal, is connected to one or more Node Bs over the Wideband Code Division Multiple Access (WCDMA) based radio interface.

This specification focuses on WCDMA systems for simplicity, but it will be understood that the principles described in this application can be implemented in other digital communication systems in which an identity is used to identify a user or a channel in the uplink direction. The identity used in the WCDMA network described above will be described below.

WCDMA based UMTS network is based on direct-sequence spread-spectrum techniques. Two different spreading codes are used for identifying users (i.e. the mobile terminals) and physical channels in the uplink direction (i.e. from the mobile terminal-to-the base station). The spreading codes are added in two steps, first channelization codes with repeated cycles of symbol length, and then scrambling codes with cycles much longer than the symbol lengths.

In the uplink, the scrambling codes are used to identify the users, and the channelization codes are used to identify the different dedicated channels for a specific user. E.g. in concurrent voice and data communication within a mobile terminal, channelization codes are used to identify the respective dedicated channels. This structure is also used by e.g. CDMA2000 networks which is another example of a CDMA based network.

Since the users share the same radio resource in CDMA systems, it is important that each physical channel does not use more power than necessary. This is achieved by power control mechanism, in which the base station and/or RNC estimates the signal-to-interference ratio (SIR) for its dedicated physical channel (DPCH), compares the estimated SIR against a reference value, and informs the mobile terminal to adjust the mobile station's transmitted DPCH power to an appropriate level. WCDMA terminology is used here, but it will be appreciated that other systems have corresponding terminology. Scrambling and channelization codes and transmit power control are well known in the art.

Uplink interference mitigation is seen as an important method that may increase the capacity and/or coverage of a cellular system. One interference mitigation method is interference cancellation. Since the perceived uplink interference contribution from each link is reduced with interference cancellation, each mobile can use a lower transmission power to reach an acceptable signal to interference and noise level after some of the interference has been cancelled. Coverage probability is directly related to the link budget, or more precisely the probability that the required transmission power is lower than the maximum transmission uplink power. A lower interference level with interference cancellation means that the available uplink power will suffice further away from the base station. Similarly, the lower interference from other users also means that the interference cancellation gain can be seen as a capacity gain, allowing more users to operate. Uplink capacity is related to uplink noise rise, i.e. total received uplink power relative the noise power. Since the perceived uplink interference contribution from each link is reduced, more users can be admitted to meet the uplink noise rise requirement when using interference cancellation. Hence, the interference cancellation gain can either be utilized as a coverage gain or a capacity gain, or a combination of both.

Another interference mitigation method is multi-user detection. Typically, the multi-user receiver utilizes channel estimates related to connected users to improve decoding performance over a conventional RAKE receiver. The optimal solution is typically not tractable, but extensive research has been focused on sub-optimal receivers. They all aim at estimating the channel from known, i.e. connected, users. However, users connected to other cells are seen as non-cancelable interference.

In 3GPP Release 6, the WCDMA standard is extended with the Enhanced Uplink concept. This concept introduces the Enhanced Dedicated Transport Channel, E-DCH. A further description can be found in 3GPP TS 25.309 "FDD Enhanced Uplink; Overall description". The Enhanced Uplink concept allows considerably higher peak data-rates in the WCDMA uplink.

With the above enhanced uplink concept, it is possible to face the situation where one or a few users are allocated all the uplink resources. In such a situation the possible inter-cell interference contribution from one single user can be very large. The control over these users is restricted to the serving Node B (typically the best serving Node B in the downlink), which have good and accurate control via the absolute grant channel and the control is also restricted to the other Node Bs in the active set, which have less accurate control via the relative grant channel. I.e. the serving Node B is able to control the data rate, and thus the interference, of E-DCH UEs very detailed by means of the absolute grant channel (AGCH)

while the other Node Bs in the E-DCH active set (the E-DCH active set comprises the base stations having an E-DCH connection to the UE) may also influence the data rate, but not that detailed, e.g. only relatively, via the relative grant channel (RGCH). Node Bs outside the E-DCH active set are however not able to control the data rate at all which implies that the Node Bs outside the E-DCH active set cannot control the inter-cell interference.

It should be noted that this problem is not limited to a WCDMA network with enhanced uplink, but the possible inter-cell interference contribution from one single user can be much larger for E-DCH users. Such high inter-cell interference critically limits the E-DCH peak data rates. In this case interference cancellation is not an option, since the corresponding scrambling codes are not known outside the E-DCH active set.

Inter-cell interference in other cellular networks such as GSM/EDGE, D-AMPS IS-136, IS-95, cdma2000, evolved 3G, 4G, OFDM systems etc also occurs since each base station is only able to control the allocation of resources within its service area. Such inter-cell interference may degrade the system performance and reduce the system capacity.

SUMMARY

Thus, an object is to reduce the uplink inter-cell interference in a mobile telecommunication network.

The first unit according to a first aspect manages information of at least one additional identity of a mobile terminal or a channel, belonging to at least a second base station that it should be aware of for interference mitigation purposes. The first unit mitigates cell-interference caused by a mobile terminal or channel identified by the additional identity, makes it possible to reduce the uplink inter-cell interference in a mobile telecommunication network.

The second unit according to a second aspect reserves at least one identity for identifying a mobile terminal or for identifying a channel served by the base station in order to make the at least one identity identifiable to at least a second base station, which makes it possible to reduce the uplink inter-cell interference in a mobile telecommunication network.

The method according to a third aspect comprises the steps of managing information of at least one additional identity of a mobile terminal or a channel, belonging to at least a second base station, it should be aware of for interference mitigation purposes, and mitigating cell-interference caused by a mobile terminal or channel identified by the additional identity, makes it possible to reduce the uplink inter-cell interference in a mobile telecommunication network.

The method according to a fourth aspect comprises the step of reserving at least one identity for identifying a mobile terminal or for identifying a channel served by the base station in order to make the at least one identity identifiable to at least a second base station, makes it possible to reduce the uplink inter-cell interference in a mobile telecommunication network.

An advantage with the technology described in this application is that it is possible to allocate a high peak rate to high data rate users, without reducing the available intra-cell resources to a great extent.

A further advantage is that intra-cell interference is cancelled well, since inter-cell interference might dominate the effective interference.

In typical situations, high data rates are very carefully allocated to not increase the inter-cell interference. That depends on that the worst case behaviour at high data rates is very difficult to handle. An advantage with the technology described in this application is that it is possible to borrow from the inter-cell interference margin that otherwise is strictly observed since it is in that case desirable to avoid the worst case behaviour.

BRIEF DESCRIPTION OF THE DRAWINGS

The objects and advantages will be apparent from reading this description in conjunction with the drawings, in which.

DETAILED DESCRIPTION OF THE INVENTION

The technology will be described more fully hereinafter with reference to the accompanying drawings, in which non-limiting, example embodiments are shown. This technology described in this application may, however, be embodied in many different forms and should not be construed as limited to the embodiments set forth herein.

A first base station is made aware of which resources are allocated at at least a second base station. The allocated resources may cause inter-cell interference between the first and second base stations. These allocated resources are preferably allocated to high priority users, which results in an increased risk of inter-cell interference. Hence, the first base station is able to mitigate the interference that may degrade the system performance, since the first base station is aware of the allocated resources in terms of an identity identifying the radio resource, i.e., a channel, or an identity identifying the mobile terminal allocated the radio resource.

Figure 1:
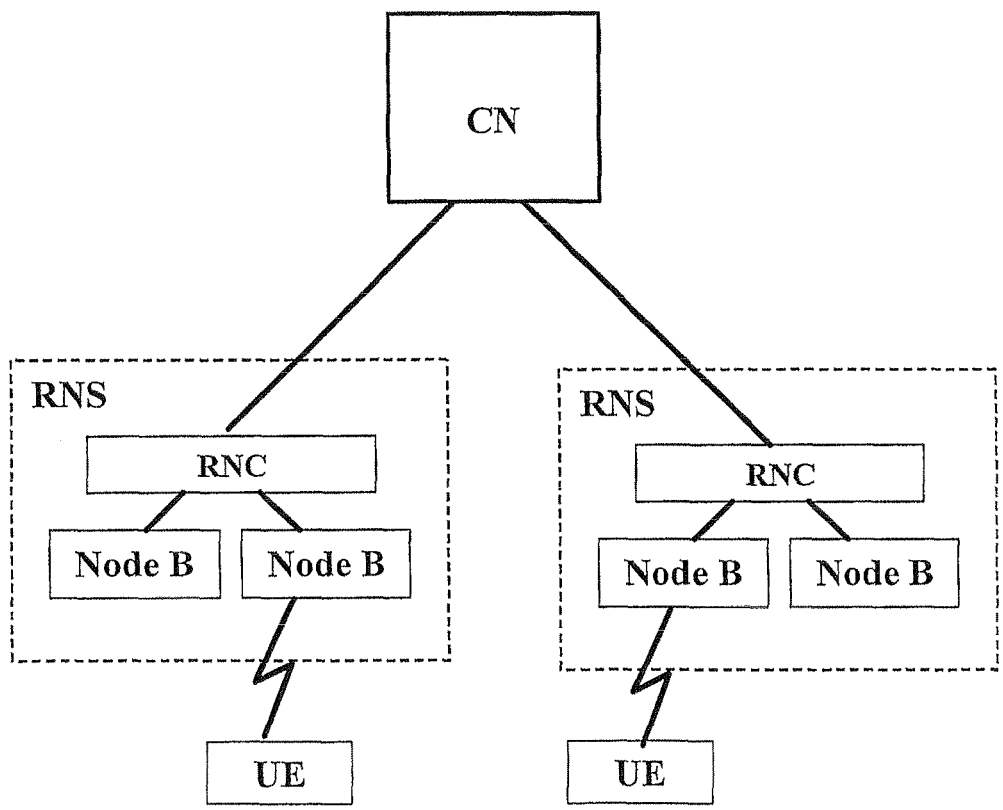
FIG. 1 depicts a communication system.
Figure 2:
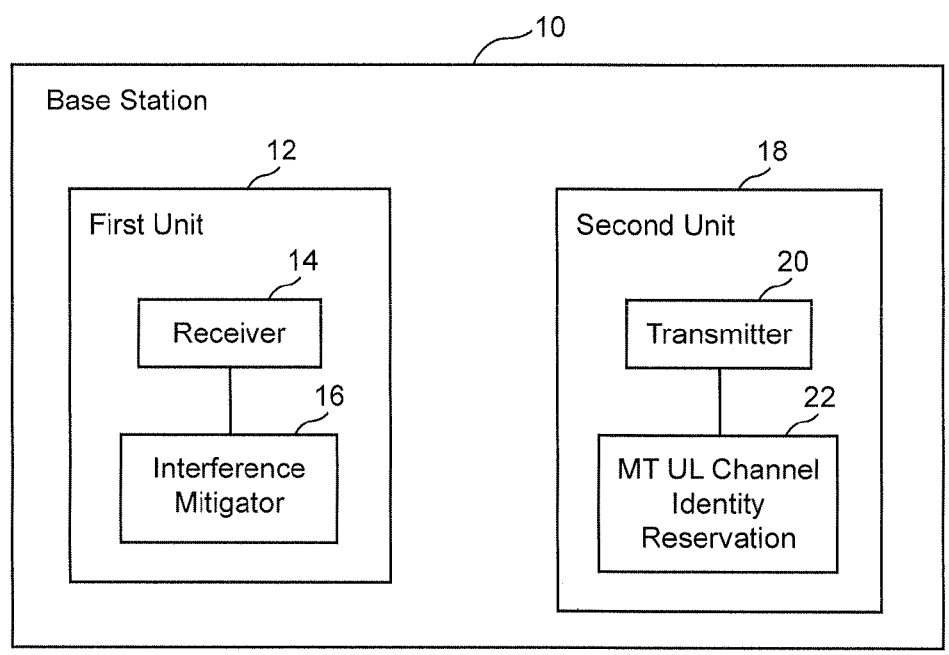
FIG. 2 is a function block diagram of a base station.

Referring to FIG. 2, a first unit 12 is adapted to be used in a base station 10 in a mobile telecommunication network adapted to use an identity for identifying a mobile terminal served by that base station or for identifying a channel in the uplink direction provided by that base station. The first unit 12 includes an interference mitigator 16 to manage information of at least one additional identity of a mobile terminal or a channel, belonging to at least a second base station, for interference mitigation purposes, and that includes means for mitigating cell-interference caused by a mobile terminal or a channel identified by the additional identity.

According to another aspect, a second unit 18 is adapted to be used in the above mentioned second base station. The second base station is also adapted to use an identity for identifying a mobile terminal or for identifying a channel in the uplink. The second unit in the second base station comprises means for reserving an identity 22, i.e. the additional identity, for identifying a mobile terminal or for identifying a channel in order to make the at least one identity identifiable to the first base station.

The identity used to identify a mobile terminal or a channel comprises a spreading code according to one preferred embodiment. The spreading code may be denoted scrambling code in CDMA-based and OFDM-based networks. The scrambling code may identify a mobile terminal or a channel allocated to a mobile terminal. (It should be noted that one mobile terminal may have more than one channel allocated simultaneously.) Thus, the scrambling codes may be reserved at the second base station for e.g. high priority, or high data rate, E-DCH (Enhanced Dedicated Channel) users or channels, wherein means are provided that make the reserved scrambling codes identifiable by at least a second base station. It should be noted that the term user is used to indicate a User Equipment also referred to as a mobile terminal in this specification and a user may be allocated one or more channels. Thus, the identity to be used for making the first base station aware of which resources that are allocated may be an identity identifying the mobile terminal, the channel or a combination thereof. Another example of identity to be used is a training sequence code that together with the time slot number and the frequency is used to identify a mobile terminal and a cell in a GSM network.

The first unit adapted to be used in the first base station according to the preferred embodiment comprises means for managing information of the scrambling code reserved at the second base station. The first base station is then able to mitigate the inter-cell interference caused by the mobile terminal or channel identified by the reserved scrambling code. A variety of inter-cell interference mitigation arrangements may be used. This is discussed further below.

Information of which scrambling codes that are reserved at the second base station is known at the first base station e.g. by using one of the embodiments described below.

Further, the second unit to be used in the second base station may comprise means for transmitting 20 information of the reserved identities, e.g. the uplink scrambling codes, of UEs belonging to a node controlling the resources of the second base station e.g. the RNC or BSC, wherein the node transmits this information further to the first base station. Alternatively, the second unit may comprise means for reserving a number of pre-defined identities at a node, e.g. the RNC or BSC, to be used for the at least one reserved identity and means for selecting high priority E-DCH users to be allocated to those codes. Accordingly, the technology described in this application concerns also a node controlling at least one base station, such as a RNC or a BSC comprising means for receiving and transmitting information of the reserved identities. A new Information Element may be introduced that indicates the reserved identities.

The first unit to be used at the first base station may be adapted to receive information of the reserved identities from that node, e.g. the RNC, in the network. However, the information of the reserved scrambling codes e.g. intended for high data rate users may also be hard coded at deployment of the network.

According to a first alternative, the base stations controlled by that RNC are informed of the reserved scrambling codes of the other base stations connected to their corresponding RNCs (i.e. the other base stations could be connected to the same RNC or to different RNC). The RNCs may be located at the same place, but still represents different RNC entities.

According to a second alternative, the node (e.g. the RNC, the O&M center, or similar) informs each controlled base station of the identities that belong to base stations of neighbour cells. The neighbour cell list may be used to guide the node in the decision of how to distribute the knowledge about the reserved identities of other base stations.

According to a third alternative, the node is adapted to inform the first units which codes that are currently allocated within reasonable distance radio-wise, e.g. by using neighbour cell information.

According to a preferred non-limiting, example embodiment, the first unit comprises means for detecting whether the mobile terminal or channel identified by said additional identity is active. Since the first unit to be used at the first base station has information of allocated resources at the second base station, i.e. by knowing the identities of mobile terminals using the allocated resources, the first base station is able to apply interference mitigation to the mobile terminals of the second base station. Thus according to this preferred non-limiting, example embodiment, the first unit at the first base station would preferably first detect whether the identified mobile terminals/channels are active i.e. connected to the second base station, since the interference mitigation should preferably only be performed if the identified mobile terminal/channel is active. That implies that the non-connected mobile terminals are only decoded for interference mitigation purposes, and the decoded data information is typically not sent further on to the RNC. In order to detect whether a mobile terminal is active, the received power of the identified mobile terminal or channel of the second base station is compared to the power of the mobile terminals served by the first base station.

Different interference mitigation methods that may be used are different types of interference cancellation and multi-user detection (MUD). Examples of interference cancellation methods are parallel partial interference cancellation wherein the decoder toggles between decoding individual users, and using decoded information to reproduce and subtract interference, and sequential interference cancellation, wherein the first user is decoded, and its signal is reproduced, then the reproduced signal is subtracted from the received signal and the second user is decoded from the remaining signal, then its signal is reproduced, and the first two reproduced signals are subtracted from the received signal, and the third user is decoded from the remaining signal, etc.

The inter-cell interference mitigation results in that higher maximum data rate for the users can be allowed since the corresponding interference contribution from e.g. the high priority E-DCH users can be cancelled by the base stations that are aware of the reserved identities.

The set of reserved identities may be set in real time e.g. via signalling, or periodically e.g. via Operation and Maintenance typically every day or week.

The technology described in this application also relates to methods. The first method comprises the steps of managing information of at least one additional identity of a mobile terminal or a channel, belonging to at least a second base station, it should be aware of for interference mitigation purposes, and mitigating cell-interference caused by a mobile terminal or channel identified by the additional identity. In addition to the first method, a second method reserves at the second base station at least one identity for identifying a mobile terminal or for identifying a channel served by the base station in order to make the at least one identity identifiable to at least the first base station.

The method may be implemented by a computer program product. Such a computer program product may be directly loadable into a processing means in a computer, comprising the software code means for performing the steps of the method.

The computer program product may be stored on a computer usable medium, comprising readable program for causing a processing means in a computer, to control the execution of the steps of the method.

According to further aspects, a base station comprises the first unit, the second unit or preferably both the first and second units.

Although the description focuses on 3G, Enhanced Uplink, the technology described in this application can be generally applicable to mitigate inter-cell interference in other cellular networks such as GSM, evolved 3G, 4G, OFDM systems.

In the drawings and specification, there have been disclosed typical preferred non-limiting, example embodiments and, although specific terms are employed, they are used in a generic and descriptive sense only and not for purposes of limitation. The scope of the invention is defined by the claims.

The invention claimed is:

1. A first unit adapted to be used in a first base station providing service in a first cell in a mobile telecommunication network, the first base station unit configured to:
   receive information about a mobile terminal-specific uplink radio traffic channel, corresponding to an enhanced dedicated channel (E-DCH), currently reserved for and dedicated to a mobile terminal to transmit uplink in a second cell associated with a second base station and serving the mobile terminal, and
   mitigate cell interference in the first cell caused by the mobile terminal uplink transmission in the second cell by the first base station unit using the received information about the mobile terminal-specific uplink radio traffic channel currently reserved for and dedicated to the mobile terminal to perform an interference mitigation operation on an uplink transmission received by the first base station from the mobile terminal and using an interference cancellation or a Multi-User Detection arrangement included in the first base station,
   wherein:
      cells having an E-DCH connection to the mobile terminal are included in an E-DCH active set,
      the second cell is included in the E-DCH active set,
      the first cell is not included in the E-DCH active set, and
      the E-DCH currently reserved for and dedicated to the mobile terminal is not known to the first cell.

2. The first unit according to claim 1, wherein the mobile terminal-specific uplink radio channel is a mobile terminal-specific uplink spreading code.

3. The first unit according to claim 2, wherein the mobile terminal-specific uplink radio channel is a mobile terminal-specific uplink scrambling code and the mobile telecommunication network is a CDMA or a OFDM based network.

4. The first unit according to claim 1, wherein the first unit is further configured to detect whether the mobile terminal is active and currently transmitting uplink in the second cell using the mobile terminal-specific uplink radio channel to mitigate cell interference in the first cell caused by the mobile terminal transmission in the second cell.

5. The first unit according to claim 4, wherein the first unit is further configured to compare a received power associated with the mobile terminal transmission in the second cell with a received power of mobile terminals in the first cell.

6. The first unit according to claim 1, wherein the first unit is further configured to receive the information from a radio network controller node, a base station controller node, or an operations and maintenance node.

7. The first unit according to claim 1, wherein the first unit is further configured to receive information in a standardized information element.

8. A second unit adapted to be used in a second base station providing service in a second cell in a mobile telecommunication network, the second base station configured to:
   reserve a mobile terminal-specific uplink radio traffic channel, corresponding to an enhanced dedicated channel (E-DCH), for the mobile terminal to transmit data traffic uplink in the second cell associated with the second base station and serving the mobile terminal, and
   provide information about the reserved mobile terminal-specific uplink radio traffic channel for the mobile terminal to transmit uplink in the second cell to at least a first base station serving a first cell to permit the first base station to mitigate cell interference in the first cell caused by uplink transmission by the mobile terminal in the second cell using the mobile terminal-specific uplink radio traffic channel currently reserved for and dedicated to the mobile terminal by the first base station unit using the provided information to perform an interference mitigation operation on an uplink traffic transmission received by the first base station from the mobile terminal and using an interference cancellation or a Multi-User Detection arrangement included in the first base station,
   wherein:
      cells having an E-DCH connection to the mobile terminal are included in an E-DCH active set,
      the second cell is included in the E-DCH active set,
      the first cell is not included in the E-DCH active set, and
      the E-DCH currently reserved for and dedicated to the mobile terminal is not known to the first cell.

9. The second unit according to claim 8, wherein the reserved mobile terminal-specific uplink radio channel is a mobile terminal-specific uplink spreading code.

10. The second unit according to claim 9, wherein the reserved mobile terminal-specific uplink radio channel is a mobile terminal-specific uplink scrambling code and the mobile telecommunication network is a WCDMA or a OFDM based network.

11. A method in a first base station providing service in a first cell in a mobile telecommunication network comprising the steps of:
    receiving information about a mobile terminal-specific uplink radio traffic channel, corresponding to an enhanced dedicated channel (E-DCH), currently reserved for and dedicated to a mobile terminal to transmit uplink in a second cell associated with a second base station and serving the mobile terminal, and
    mitigating cell interference in the first cell caused by the mobile terminal uplink transmission in the second cell by the first base station unit using the received information about the mobile terminal-specific uplink radio traffic channel currently reserved for and dedicated to the mobile terminal to perform an interference mitigation operation on an uplink transmission received by the first base station from the mobile terminal and using an interference cancellation or a Multi-User Detection arrangement included in the first base station,
    wherein:
       cells having an E-DCH connection to the mobile terminal are included in an E-DCH active set,
       the second cell is included in the E-DCH active set,
       the first cell is not included in the E-DCH active set, and
       the E-DCH currently reserved for and dedicated to the mobile terminal is not known to the first cell.

12. The method according to claim 11, wherein the mobile terminal-specific uplink radio channel is a mobile terminal-specific uplink is a mobile terminal-specific uplink spreading code.

13. The method according to claim 12, wherein the mobile terminal-specific uplink radio channel is a mobile terminal-specific uplink is a mobile terminal-specific uplink scrambling code and the mobile telecommunication network is a CDMA or a OFDM based network.

14. The method according to claim 11, further comprising:
    comparing a received power associated with the mobile terminal transmission in the second cell with a received power of mobile terminals in the first cell.

15. The method according to claim 11, further comprising the step of:
    receiving the information from a radio network controller node, a base station controller node, or an operations and maintenance node.

16. The method according to claim 15, wherein the information is received in a standardized information element.

17. A method in a second base station providing service in a second cell in a mobile telecommunication network, comprising:
reserving a mobile terminal-specific uplink radio traffic channel, corresponding to an enhanced dedicate channel (E-DCH), for the mobile terminal to transmit uplink in the second cell associated with the second base station and serving the mobile terminal, and
providing information about the reserved mobile terminal-specific uplink radio traffic channel for the mobile terminal to transmit uplink in the second cell to at least a first base station serving a first cell to permit the first base station to mitigate cell interference in the first cell caused by the mobile terminal transmitting in the second cell on the reserved mobile terminal-specific uplink radio channel by the first base station unit using the provided information to perform an interference mitigation operation on an uplink traffic transmission received by the first base station from the mobile terminal and using an interference cancellation or a Multi-User Detection arrangement included in the first base station,
wherein:
cells having an E-DCH connection to the mobile terminal are included in an E-DCH active set,
the second cell is included in the E-DCH active set,
the first cell is not included in the E-DCH active set, and
the E-DCH currently reserved for and dedicated to the mobile terminal is not known to the first cell.

18. The method according to claim 17, wherein the reserved mobile terminal-specific uplink radio channel is a mobile terminal-specific uplink scrambling code and the mobile telecommunication network is a WCDMA or a OFDM based network.

* * * * *

UNITED STATES PATENT AND TRADEMARK OFFICE
CERTIFICATE OF CORRECTION

PATENT NO. : 8,965,292 B2
APPLICATION NO. : 11/990691
DATED : February 24, 2015
INVENTOR(S) : Hagerman et al.

Page 1 of 1

It is certified that error appears in the above-identified patent and that said Letters Patent is hereby corrected as shown below:

Specification
In Column 4, Line 15, delete "DESCRIPTION OF THE INVENTION" and insert
-- DESCRIPTION --, therefor.

Signed and Sealed this
Fifth Day of July, 2016

Michelle K. Lee
*Director of the United States Patent and Trademark Office*